(12) United States Patent
Watanabe et al.

(10) Patent No.: US 6,351,649 B1
(45) Date of Patent: Feb. 26, 2002

(54) MOBILE COMMUNICATION SYSTEM

(75) Inventors: Fumio Watanabe; Yoshio Takeuchi, both of Saitama; Toshinori Suzuki, Tokyo; Hisato Iwai, Tokyo; Akira Yamaguchi, Tokyo, all of (JP)

(73) Assignee: KDD Corporation, Tokyo (JP)

( * ) Notice: Subject to any disclaimer, the term of this patent is extended or adjusted under 35 U.S.C. 154(b) by 0 days.

(21) Appl. No.: 09/276,660

(22) Filed: Mar. 26, 1999

(30) Foreign Application Priority Data

Mar. 31, 1998 (JP) ............................................ 10-101906

(51) Int. Cl.⁷ ................................................ H04B 7/01
(52) U.S. Cl. ...................... 455/501; 455/522; 455/426; 455/552
(58) Field of Search ................................ 455/422, 432, 455/433, 435, 500, 512, 513, 501, 503, 575, 426, 134, 135, 136, 67.1, 423, 552, 554, 555, 63, 527, 446, 448, 69, 70, 115, 296, 126, 127, 522, 437; 375/200, 285, 296, 346

(56) References Cited

U.S. PATENT DOCUMENTS

| | | | | |
|---|---|---|---|---|
| 5,042,083 A | * | 8/1991 | Ichikawa | 455/517 |
| 5,204,981 A | * | 4/1993 | Karasawa et al. | 455/277.1 |
| 5,212,684 A | * | 5/1993 | MacNamee et al. | 370/24 |
| 5,491,837 A | * | 2/1996 | Haartsen | 455/62 |
| 5,594,946 A | * | 1/1997 | Menich | 455/522 |
| 5,655,001 A | * | 8/1997 | Cline et al. | 370/328 |
| 5,697,056 A | * | 12/1997 | Tayloe | 455/513 |
| 5,787,352 A | * | 7/1998 | Benveniste | 455/452 |
| 5,794,157 A | * | 8/1998 | Haartsen | 455/522 |
| 5,870,673 A | * | 2/1999 | Haartsen | 455/426 |
| 5,878,329 A | * | 3/1999 | Mallinckrodt | 455/69 |
| 5,953,323 A | * | 9/1999 | Haartsen | 370/330 |
| 5,987,055 A | * | 11/1999 | Duque-Anton et al. | 375/200 |
| 5,995,832 A | * | 11/1999 | Mallinckrodt | 455/427 |
| 6,035,213 A | * | 3/2000 | Tokuda et al. | 455/553 |
| 6,052,593 A | * | 4/2000 | Guimont et al. | 455/446 |
| 6,128,473 A | * | 10/2000 | Ritzen et al. | 455/63 |
| 6,169,895 B1 | * | 1/2001 | Burhmann et al. | 455/423 |

* cited by examiner

Primary Examiner—Dwayne Bost
Assistant Examiner—Joy K. Contee
(74) Attorney, Agent, or Firm—Arent Fox Kintner Plotkin & Kahn, PLLC

(57) ABSTRACT

A mobile communication system includes a first and second systems. Each of the first and second systems has a land station and at least one mobile terminal capable of communicating with the land station. The land station of the first system has a broadcasting channel transmission unit for transmitting status information via a broadcasting channel, and the mobile terminal of the second system has a broadcasting channel receiving unit for receiving information in the broadcasting channel to obtain a broadcasting channel receiving condition and the status information, a giving interference estimation unit for estimating giving interference level onto communication of the first system by the second system based upon the obtained broadcasting channel receiving condition and the obtained status information, and an output signal level control unit for controlling output signal level of the mobile terminal of the second system based upon the estimated giving interference level.

36 Claims, 12 Drawing Sheets

MOBILE COMMUNICATION SYSTEM

FIELD OF THE INVENTION

The present invention relates to a mobile communication system, in which wireless land stations and mobile portable wireless terminals do communication, and in which hierarchically designed different kinds of communication subsystems can share the same radio frequency channel. Particularly, the present invention is applied to a multiple access communication system using CDMA (Code Division Multiple Access).

DESCRIPTION OF THE RELATED ART

In order to share the same radio frequency among a plurality of mobile communication systems, according to a conventional art, the systems are prioritized at usage of the radio frequency channel. The systems are categorized into two types, a main system (primary system) and a sub-system (secondary system).

In a specific application of such system, the primary system may be a public mobile communication system (hereinafter called public system) and the secondary system may be a private mobile communication system (hereinafter private system).

Such public system and private system, which are different each other, can not share the same radio frequency channel. Because sharing the same radio frequency channel causes interference between the two different systems. Therefore, even if the method of the wireless communication such as methods of encoding, modulation, demodulation and decoding is the same, different radio frequency channels are allocated to the systems to avoid the interference. For example, different radio frequencies are allocated to a public PHS (Personal Handy-phone System) and a private digital codeless phone system in personal handy-phone communication.

In a first conventional art for sharing the same radio frequency channel between the two systems, the service area and the radio frequency output signal level in the private system are limited to avoid the interference to the public system. However, the distance between the private terminal and the public land station or the distance between the public terminal and the private land station is short, some interference might be caused, even if the output signal level used in the private system is very low.

In a second conventional art, the system is based upon the standard of IS-94 (EIA/TIA/IS-94, "Mobile Station Land Station Compatibility Specification for Analogue Cellular Auxiliary Personal Communication Service", TIA)

FIG. 1 illustrates the system configuration based upon the standard of IS-94. In the figure, reference numeral 11 denotes a public terminal in the public system, 21 a public land station in the public system, 12 a private terminal in the private system, 22 private land stations in the private system, 23 a radio frequency channel scanning station in the private system, 24 a control equipment in the private system, and 25 a PBX in the private system. The scanning station 23 in the private system can receive the radio waves from the public land station 21 and the public terminal 11.

The wireless channel scanning station 23 is to detect what radio frequency channels are used in the public communication system by monitoring the radio waves of the system. By this scanning, the private system can determine the usable radio frequency channel and can share the same radio frequency without interference onto the public system.

First problem of this conventional art is that there is a definite probability to disturb the public communication and it is difficult to guarantee no interference. This depends upon the locations of the wireless channel scanning station 23, the private land stations 22 and the private terminal 12.

FIG. 2 illustrates the problem of the system in FIG. 1, which depends upon the locations of the radio frequency channel scanning station 23, the private land station and the private terminal 12.

Here it is assumed that the private terminal 12 is located near the public land station 21 and the radio frequency channel scanning station 23 is far away from the public land station 21. The private terminal 12 may interfere the public land station 21, even if the radio frequency channel-scanning station 23 confirms no usage of the channel.

In order to solve this first problem, it is necessary to place many radio frequency channel-scanning stations in the service area of the private land station and the terminals. But such way of problem solution is very expensive and eventually it becomes difficult to detect a usable channel.

Second problem of this configuration is that the system with the radio frequency channel scanning station 23 is limited to cellular systems of FDMA (Frequency Division Multiple Access) and TDMA (Time Division Multiple Access) in which there are great number of radio frequency channels and the neighboring land stations do not use the same frequency channel.

FIG. 3 shows the frequency channel structure of the cellular system. In the figure, the same frequency channel is shared at every 7 cells.

In this cellular system, the size of a cell area of the private system is much smaller than that of a cell area of the public system and a radio frequency channel which is not used by a near public land station is permitted to use in order to avoid interference to the public system. Therefore, this system can not be applied to a system by CDMA in which only one channel or a few channels are used.

When a number of systems for mobile communication share the same radio frequency channel in an service area, there is no way other than lowering the radio frequency output signal level of the secondary system or utilizing not used radio frequency channel by the primary system to prevent the interference to the primary system. In each case it is difficult to keep the interference level less than a certain specified level and to guarantee the communication quality of a the primary system.

Lowering the radio frequency output signal level of the secondary system to prevent the interference might cause a difficulty in the communication by the secondary system due to the small output signal level. Utilizing not used radio frequency channel by the primary system to prevent the interference can not be applied to a system by CDMA in which only one channel or a few channels are used.

SUMMARY OF THE INVENTION

It is therefore an object of the present invention to provide a mobile communication system with a plurality of systems each of which has a land station and mobile portable terminals capable of communicating with the land station share the same frequency channels, whereby interference by a secondary system is controlled and kept less than a specified certain level for guaranteeing the communication quality in a primary system, and whereby the resource of the radio frequency channel is maximally utilized under the conditions of guaranteeing the communication quality of the primary system.

According to the present invention, a mobile communication system includes a first and second systems. Each of the first and second systems has a land station and at least one mobile terminal capable of communicating with the land station. The land station of the first system has a broadcasting channel transmission unit for transmitting status information via a broadcasting channel, and the mobile terminal of the second system has a broadcasting channel receiving unit for receiving information in the broadcasting channel to obtain a broadcasting channel receiving condition and the status information, a giving interference estimation unit for estimating giving interference level onto communication of the first system by the second system based upon the obtained broadcasting channel receiving condition and the obtained status information, and an output signal level control unit for controlling output signal level of the mobile terminal of the second system based upon the estimated giving interference level.

It is preferred that a plurality of systems are prioritized, and that the first system is a primary system and the second system is a secondary system.

In this case, preferably, the output signal level control unit includes a unit for controlling the output level depending upon traffic condition of the land station of the primary system. Also preferably, the land station of the primary system is connected with a public mobile switch system, and the land station of the secondary system is connected with a private branch exchange system.

It is also preferred that the receiving condition of the broadcasting channel includes receiving signal level from the broadcasting channel, and that the status information includes output level to the broadcasting channel.

It is further preferred that the status information includes communication channel output level from a transmitting system to the broadcasting channel.

It is preferred that the giving interference estimation unit includes a unit for estimating downward radio wave channel propagation loss Ldown from the difference between the output signal level and the received signal level of the broadcasting channel or the access channel.

Preferably, the giving interference estimation unit further includes a unit for estimating upward radio wave channel propagation loss Lup from equation, $$Lup = Ldown + A \times \log(fup/fdown) \text{ (dB)},$$

where A is a constant in the range of 20 to 35, and fup and fdown are frequencies of upward and downward communications.

Also preferably, the giving interference estimation unit further includes a unit for determining giving interference level as a value obtained by subtracting the estimated propagation loss from the output level to the broadcasting channel or the access channel.

According to the present invention, also, a mobile communication system includes a first and second systems. Each of the first and second systems has a land station and at least one mobile terminal capable of communicating with the land station. The land station of the first system has a broadcasting channel transmission unit for transmitting status information via a broadcasting channel, an access channel receiving unit for obtaining given interference level information sent via an access channel, and an output signal level control unit for controlling output signal level of the land station of the first system based upon the obtained given interference level information, and the mobile terminal of the second system has a broadcasting channel receiving unit for obtaining broadcasting channel receiving condition and status information, a given interference estimation unit for estimating given interference level onto communication of the second system by the first system based upon the obtained receiving condition and the obtained status information, and an access channel transmission unit for transmitting the estimated given interference level information to the land station of the first system.

It is preferred that a plurality of systems are prioritized, and wherein the first system is a secondary system and the second system is a primary system.

In this case, preferably, the output signal level control unit includes a unit for controlling the output level depending upon traffic condition of the land station of the primary system. Also preferably, the land station of the primary system is connected with a public mobile switch system, and the land station of the secondary system is connected with a private branch exchange system.

It is also preferred that the receiving condition of the broadcasting channel includes receiving signal level from the broadcasting channel, and that the status information includes output level to the broadcasting channel.

It is further preferred that the status information includes communication channel output level from a transmitting system to the broadcasting channel.

It is preferred that the given interference estimation unit includes a unit for estimating downward radio wave channel propagation loss Ldown from the difference between the output signal level and the received signal level of the broadcasting channel or the access channel.

Preferably, the given interference estimation unit further includes a unit for estimating upward radio wave channel propagation loss Lup from equation, $$Lup = Ldown + A \times \log(fup/fdown) \text{ (dB)},$$

where A is a constant in the range of 20 to 35, and fup and fdown are frequencies of upward and downward communications.

Also preferably, the given interference estimation unit further includes a unit for determining given interference level as a value obtained by subtracting the estimated propagation loss from the output level to the broadcasting channel or the access channel.

According to the present invention, further, a mobile communication system includes a first and second systems. Each of the first and second systems has a land station and at least one mobile terminal capable of communicating with the land station. The land station of the first system having a broadcasting channel transmission unit for transmitting status information via a broadcasting channel, an access channel receiving unit for obtaining receiving condition and status information from the mobile terminal of the second system via an access channel, a giving interference estimation unit for estimating giving interference level onto communication of the second system from the first system based upon the obtained receiving condition and the obtained status information, and an output signal level control unit for controlling output signal level of the land station of the first system based upon the estimated giving interference level, and the mobile terminal of the second system having a broadcasting channel receiving unit for obtaining the broadcasting channel receiving condition and the status information, and an access channel transmission unit for transmitting the obtained receiving condition and the obtained status information via the access channel to the land station of the first system.

It is preferred that a plurality of systems are prioritized, and that the first system is a secondary system and the second system is a primary system.

In this case, preferably, the output signal level control unit includes a unit for controlling the output level depending upon traffic condition of the land station of the primary system. Also preferably, the land station of the primary system is connected with a public mobile switch system, and the land station of the secondary system is connected with a private branch exchange system.

It is also preferred that the receiving condition of the broadcasting channel includes receiving signal level from the broadcasting channel, and that the status information includes output level to the broadcasting channel.

It is further preferred that the status information includes communication channel output level from a transmitting system to the broadcasting channel.

It is preferred that the giving interference estimation unit includes a unit for estimating downward radio wave channel propagation loss Ldown from the difference between the output signal level and the received signal level of the broadcasting channel or the access channel.

Preferably, the giving interference estimation unit further includes a unit for estimating upward radio wave channel propagation loss Lup from equation, $$Lup = Ldown + A \times \log(fup/fdown) \quad (dB),$$

where A is a constant in the range of 20 to 35, and fup and fdown are frequencies of upward and downward communications.

Also preferably, the giving interference estimation unit further includes a unit for determining giving interference level as a value obtained by subtracting the estimated propagation loss from the output level to the broadcasting channel or the access channel.

According to the present invention, in addition, a mobile communication system includes a first and second systems. Each of the first and second systems has a land station and at least one mobile terminal capable of communicating with the land station. The land station of the first system has a broadcasting channel transmission unit for transmitting status information via a broadcasting channel, an access channel receiving unit for obtaining receiving condition and status information from the mobile terminal of the second system via an access channel, a given interference estimation unit for estimating given interference level onto communication of the first system from the second system based upon the obtained receiving condition and the obtained status information, and a discrete control channel transmission unit for transmitting commands to control the output signal level of the mobile terminal of the second system based upon the estimated given interference level via a discrete control channel, and the mobile terminal of the second system has a broadcasting channel receiving unit for obtaining the broadcasting channel receiving condition and the status information, an access channel transmission unit for transmitting the obtained receiving condition and the obtained status Information to the land station of the first system via an access channel, a discrete control channel receiving unit for obtaining the commands to control the output signal level, and an output signal level control unit for controlling output signal level of the mobile terminal of the second system based upon the obtained commands.

It is preferred that a plurality of systems are prioritized, and that the first system is a primary system and the second system Is a secondary system.

In this case, preferably, the output signal level control unit includes a unit for controlling the output level depending upon traffic condition of the land station of the primary system. Also preferably, the land station of the primary system is connected with a public mobile switch system, and the land station of the secondary system is connected with a private branch exchange system.

It is also preferred that the receiving condition of the broadcasting channel includes receiving signal level from the broadcasting channel, and that the status information includes output level to the broadcasting channel.

It is further preferred that the status information includes communication channel output level from a transmitting system to the broadcasting channel.

It is preferred that the given interference estimation unit includes a unit for estimating downward radio wave channel propagation loss Ldown from the difference between the output signal level and the received signal level of the broadcasting channel or the access channel.

Preferably, the given interference estimation unit further includes a unit for estimating upward radio wave channel propagation loss Lup from equation, $$Lup = Ldown + A \times \log(fup/fdown) \quad (dB),$$

where A is a constant in the range of 20 to 35, and fup and fdown are frequencies of upward and downward communications.

Also preferably, the given interference estimation unit further includes a unit for determining given interference level as a value obtained by subtracting the estimated propagation loss from the output level to the broadcasting channel or the access channel.

Further objects and advantages of the present invention will be apparent from the following description of the preferred embodiments of the invention as illustrated in the accompanying drawings.

DESCRIPTION OF THE PREFERRED EMBODIMENTS

Figure 1:
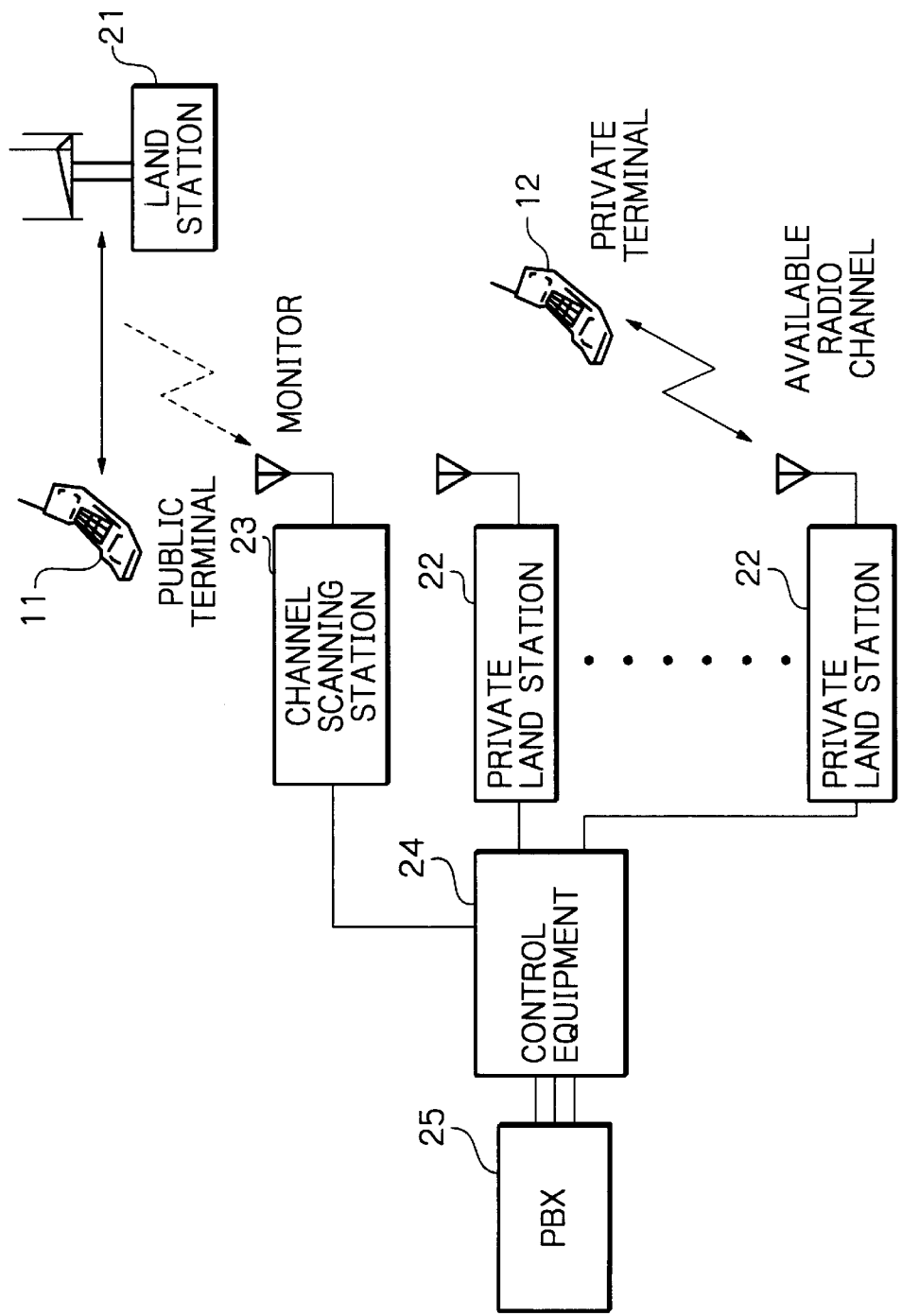
FIG. 1 which has been already described illustrates a system configuration based upon the standard IS-94.
Figure 2:
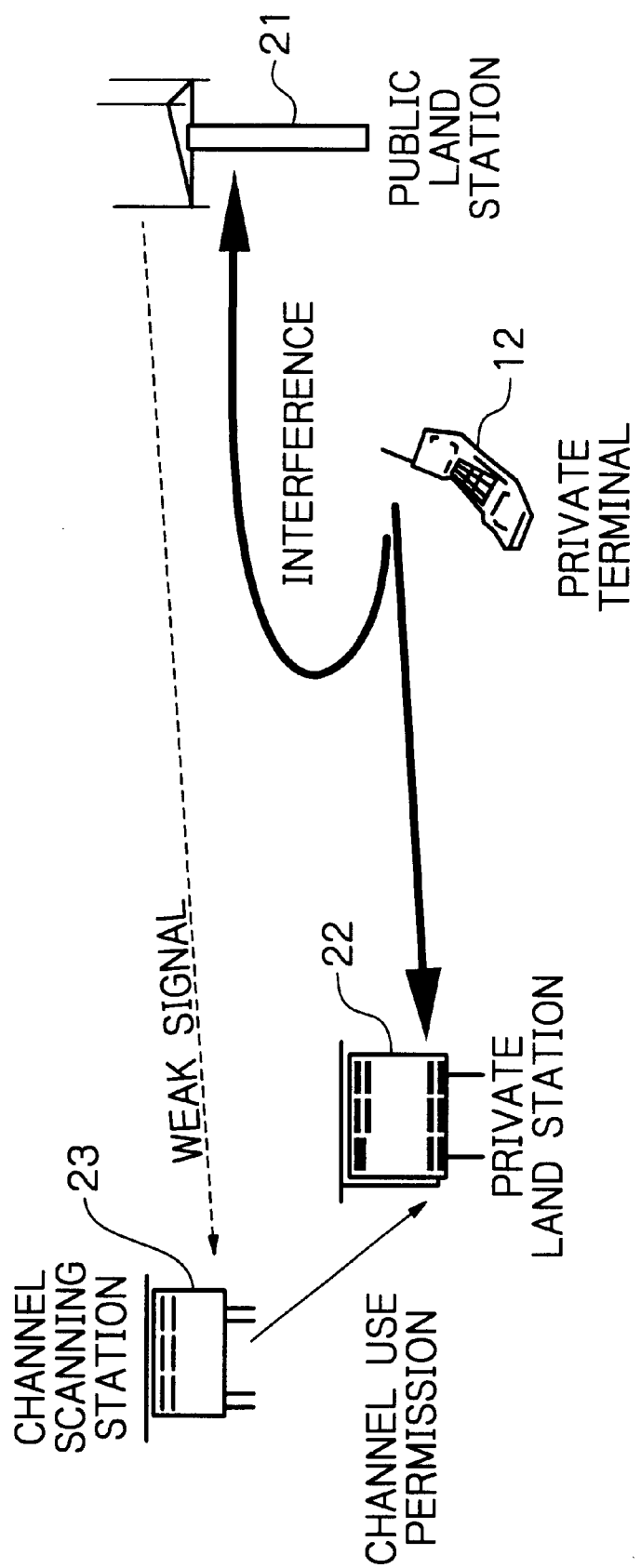
FIG. 2 which has been already described illustrates the problem of the system in FIG. 1, which depends upon the locations of the radio frequency channel scanning station, the private land station and the private terminal.
Figure 3:
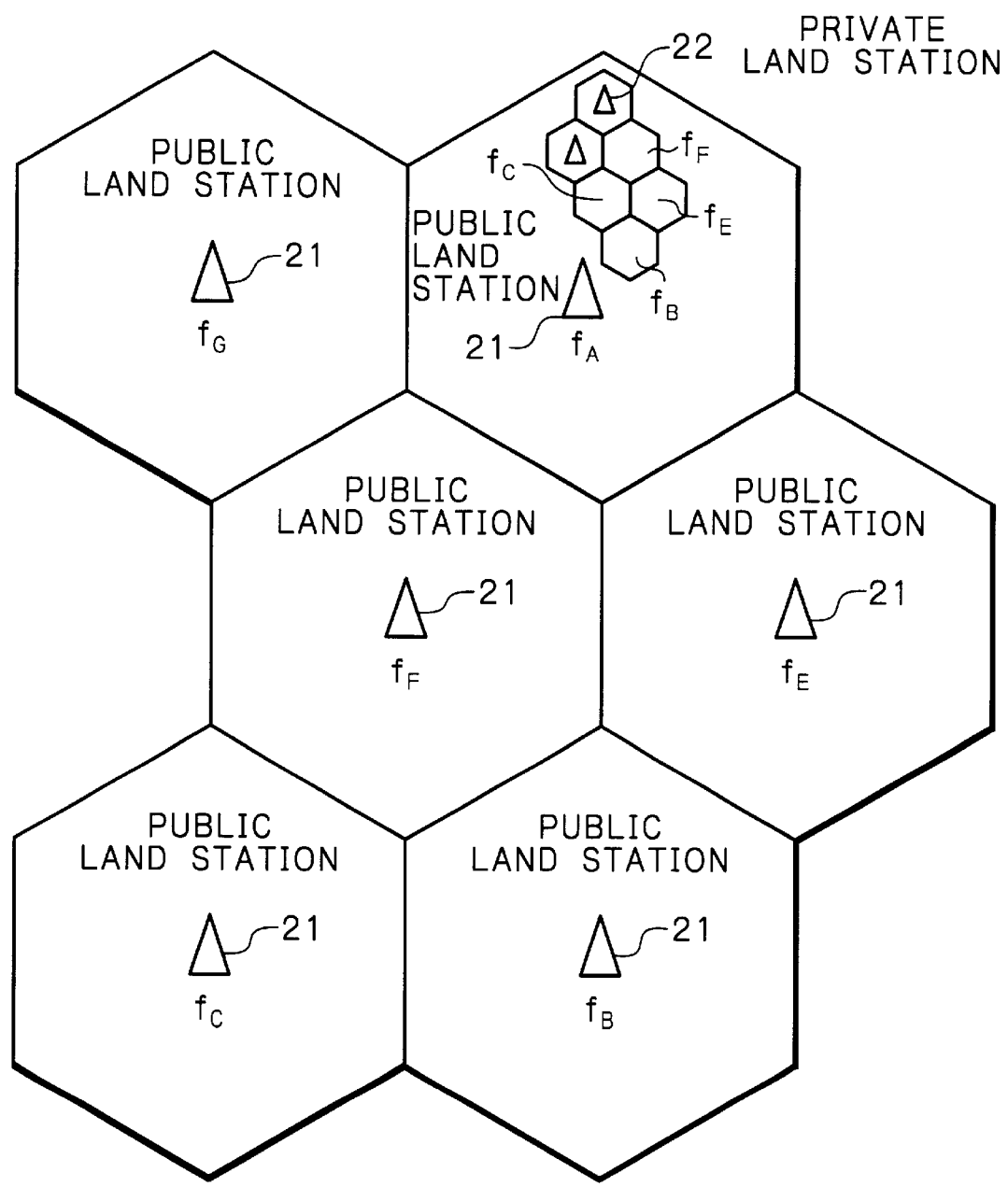
FIG. 3 which has been already described illustrates the frequency channel structure of a cellular system.
Figure 4:
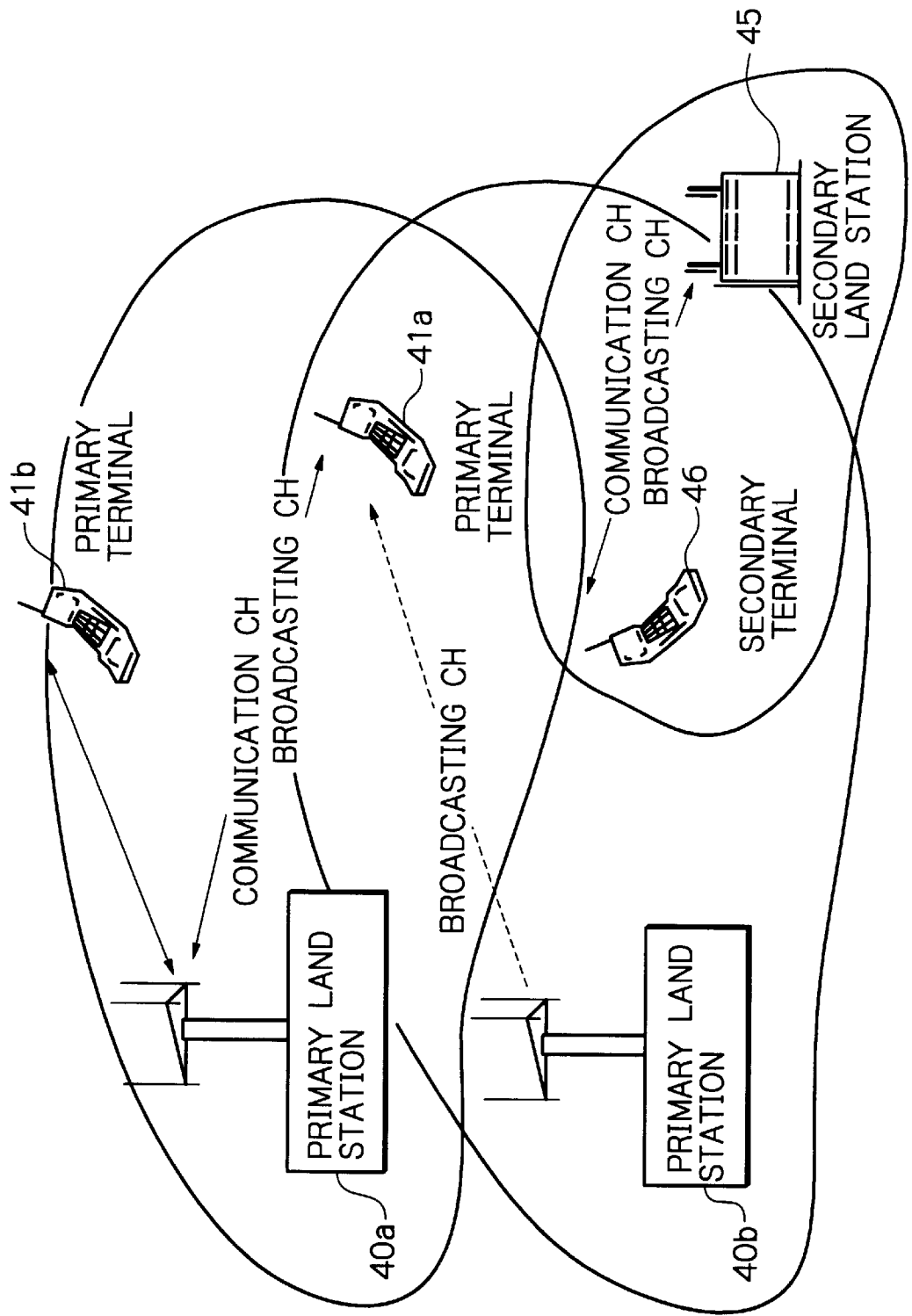
FIG. 4 illustrates a system configuration according to the present invention.

Referring to FIG. 4 which illustrates a system configuration according to the present invention, the communication system consists of primary systems and a secondary system. The primary systems consist of primary land stations 40a and 40b and primary mobile portable terminals 41a and 41b. The secondary system consists of a secondary land station 45 and a secondary mobile portable terminal 46. The communication area coverage of the primary and secondary systems are overlapped each other and the same radio frequency channel is shared. In other words, the communication in which the primary land stations 40a and 40b transmit and the primary terminals 41a and 41b receive, and the communication in which the secondary land station 45 transmits and the terminal 46 receives share a radio frequency channel each other. Also, the communication in which the primary terminals 41a and 41b transmit and the primary land stations 40a and 40b receive, and the communication in which the secondary terminal 46 transmits and the secondary land station receives share another radio frequency channel each other. The communication method between the land station and the terminal is based upon CDMA.

Here the output signal level control in CDMA is explained in general. In CDMA method, available number of user channels and available amount of traffics are determined depending upon the interference in the communication system. The radio output signal level at each terminal is to be controlled so that the field strength of radio wave received at the land station is constant in spite of moving of the terminal and possible fading. The control of the terminal radio output signal level is done by the next way. Firstly, the signal level or SIR (Signal to Interference Ratio) of radio wave from each terminal is measured at the land station, secondly the land station sends commands to each terminal to increase or decrease each radio output signal level in order to keep the measured parameters to satisfy their specific values. By this closed loop control, the communication quality from a terminal to a land station is kept well without degradation, and the interference onto the communication from another terminal to the land station is controlled less than the specified level. The communication from a land station to a terminal is also done in a similar way.

Next, hand-over process used in CDMA mobile communication according to the present invention is explained. In accordance with the moving of the terminal, the land station is switched to the neighboring one. For that purpose, as shown in FIG. 4, the terminal 41a can receive the broadcasting channel from the land station 40b other than the land station 40a with which the terminal 41a is communicating. The terminal 41a compares the received signal level or the SIR of the broadcasting channel from the land station 40b with that of the broadcasting channel from the land station 40a, and when the difference exceeds a certain threshold state for example the SIR is higher than the threshold for a predetermined period of time, the land station for communication is switched to 40b. The explained output signal level control and hand-over process are general and independent from the primary or secondary system.

The primary land stations, the primary terminals, the secondary land station and the secondary terminals are consistently controlled avoiding interference each other as follows.

Even when the transmission channel frequency of the secondary terminal and that of the primary terminal are the same, in order to prevent actual interference onto the receiving of signals which were transmitted from the primary terminal at the primary land station, the communication system according to the present invention has at least one of next functions. The secondary terminal 46 has a function of controlling its output signal level by estimating the level of the giving interference onto the primary system based upon the receiving condition and the status information of the broadcasting channel from the primary land station 40. The secondary terminal 46 has a function of controlling its output signal level based upon the output signal level control commands sent from the primary land station 40.

Also even when the transmission channel frequency of the secondary land station and that of the primary land station are the same, in order to prevent actual interference onto the receiving of signals which were transmitted from the primary land station at the primary terminal, the communication system according to the present invention has at least one of next functions. The primary terminal 41 has a function of controlling the output signal level of the secondary land station 45 by estimating the level of given interference onto the primary system based upon the receiving condition and the status information of the broadcasting channel from the secondary land station 45 and by sending signal level control commands to this secondary land station 45. The secondary land station 45 has a function of controlling its output signal level by estimating the level of giving interference onto the primary system based upon the receiving condition and the status information of the broadcasting channel from the primary terminal 41.

In the following paragraphs, each function of the land station and the terminal is described. In the following explanation, the output level of a station and a terminal is defined as the total summation output level of all of the communication channels, the broadcasting channels, the access channels, the discrete control channels and other channels.

Figure 5:
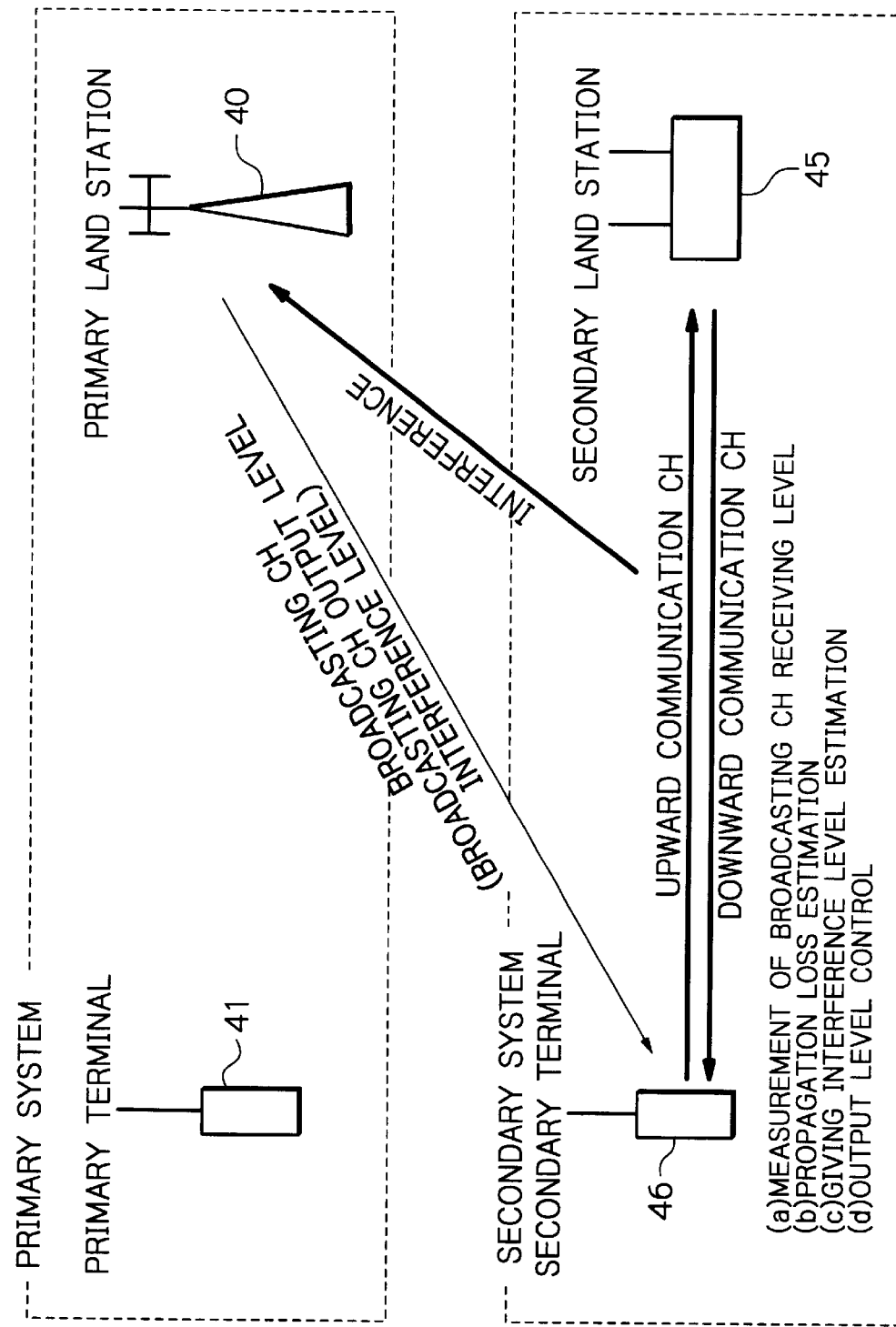
FIG. 5 illustrates a system configuration to prevent interference between a land station of a primary system and a terminal of a secondary system in a preferred embodiment according to the present invention.
Figure 6:
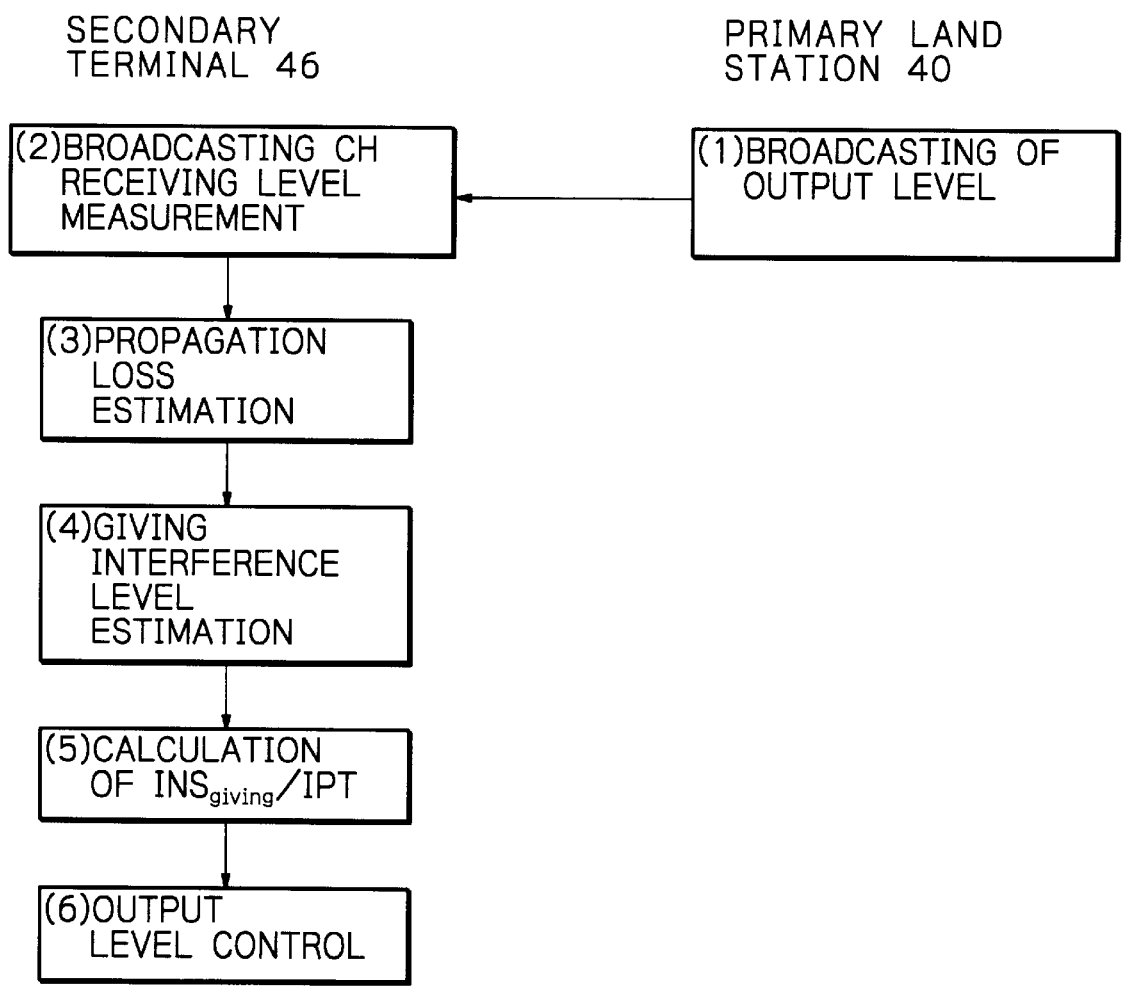
FIG. 6 illustrates a flow chart of the control process of the land station of the primary system and the terminal of the secondary system shown in FIG. 5.

FIG. 5 illustrates a system configuration to prevent interference between a primary land station 40 of a primary system and a secondary terminal 46 of a secondary system in a preferred embodiment according to the present invention, and FIG. 6 illustrates a flow chart of the control process of the primary land station 40 and the secondary terminal 46 shown in FIG. 5.

In this embodiment, the secondary terminal 46 controls its output signal level by estimating the level of the giving interference onto the primary system based upon the receiving condition and the status information of the broadcasting channel from the primary land station 40.

The primary land station 40 has a broadcasting channel transmission unit for transmitting information of the communication condition and status to the mobile portable terminals via the broadcasting channel.

The information transmitted via the broadcasting channel contains the output signal level of the broadcasting channel at the primary land station TPB (dBm), the received signal level of the broadcasting channel RPB (dBm) and the level of the interference onto the primary system IPT (dBm).

The secondary terminal 46 has a broadcasting channel receiving unit for obtaining the broadcasting channel receiving condition and the status information, a giving interference estimation unit for estimating the level of giving interference onto the primary land station 40 based upon the receiving condition and the status information, and an output signal level control unit for controlling the output level of the terminal 46 based upon the estimated level of the giving interference onto the primary land station 40.

Hereinafter, operations of this embodiment are described in detail.

(1) First, the primary land station 40 transmits the output signal level of the broadcasting channel, TPB (dBm), and the level of the interference onto the primary land station, IPT (dBm), by the broadcasting channel transmission unit via the broadcasting channel.

(2) Then, the secondary terminal 46 receives the broadcasting channel by the broadcasting channel receiving unit, and measures the receiving signal level of the broadcasting channel RPB (dBm), and also gets the output signal level of the broadcasting channel of the primary land station TPB (dBm) and the level of the interference onto the primary land station IPT (dBm) from the status information sent via the broadcasting channel.

(3) Then, the secondary terminal 46 estimates a radio wave propagation loss Ldown (dB) from the primary land station 40 to the secondary terminal 46 based upon the difference between the output level of the broadcasting channel TPB (dBm) and the receiving level of the broadcasting channel RPB (dBm). Ldown is given by the following equation, $$L\text{down} = TPB - RPB \qquad \text{(dB)}.$$

A frequency-depended propagation loss of the radio wave from the secondary terminal 46 to the primary land station 40 is estimated based upon the frequency difference. For example, the following equation is used to estimate the frequency dependency of the propagation loss;

$$L\text{up} = L\text{down} + A \times \log(f\text{up}/f\text{down}) \qquad \text{(dB)}$$

where A is a constant in the range of 20 through 35, usually about 26 is used for it.

(4) Then, the secondary terminal 46 estimates the level of giving interference onto the primary land station 40, INSgiving (dBm), based upon the output level of the secondary terminal 46, TT (dBm), and the previously estimated value of the propagation loss, Lup (dB), using the following equation, $$INS\text{ give} = TT - L\text{up} \qquad \text{(dBm)}.$$

(5) Thereafter, the secondary terminal 46 calculates a ratio of the estimated giving interference level INSgiving (dBm) to the given interference level at the primary land station IPT (dBm) based upon the received value of the interference IPT (dBm) via the broadcasting channel and the estimated giving interference level INSgiving (dBm).

(6) Finally, when the calculated ratio exceeds a specific level or the estimated giving interference level INSgiving (dBm) exceeds a specified level, the output signal level control unit in the secondary terminal 46 controls to lower its output signal level. This lowering control takes priority over the output level control for the communication between the secondary terminal 46 and the secondary land station 45.

Figure 7:
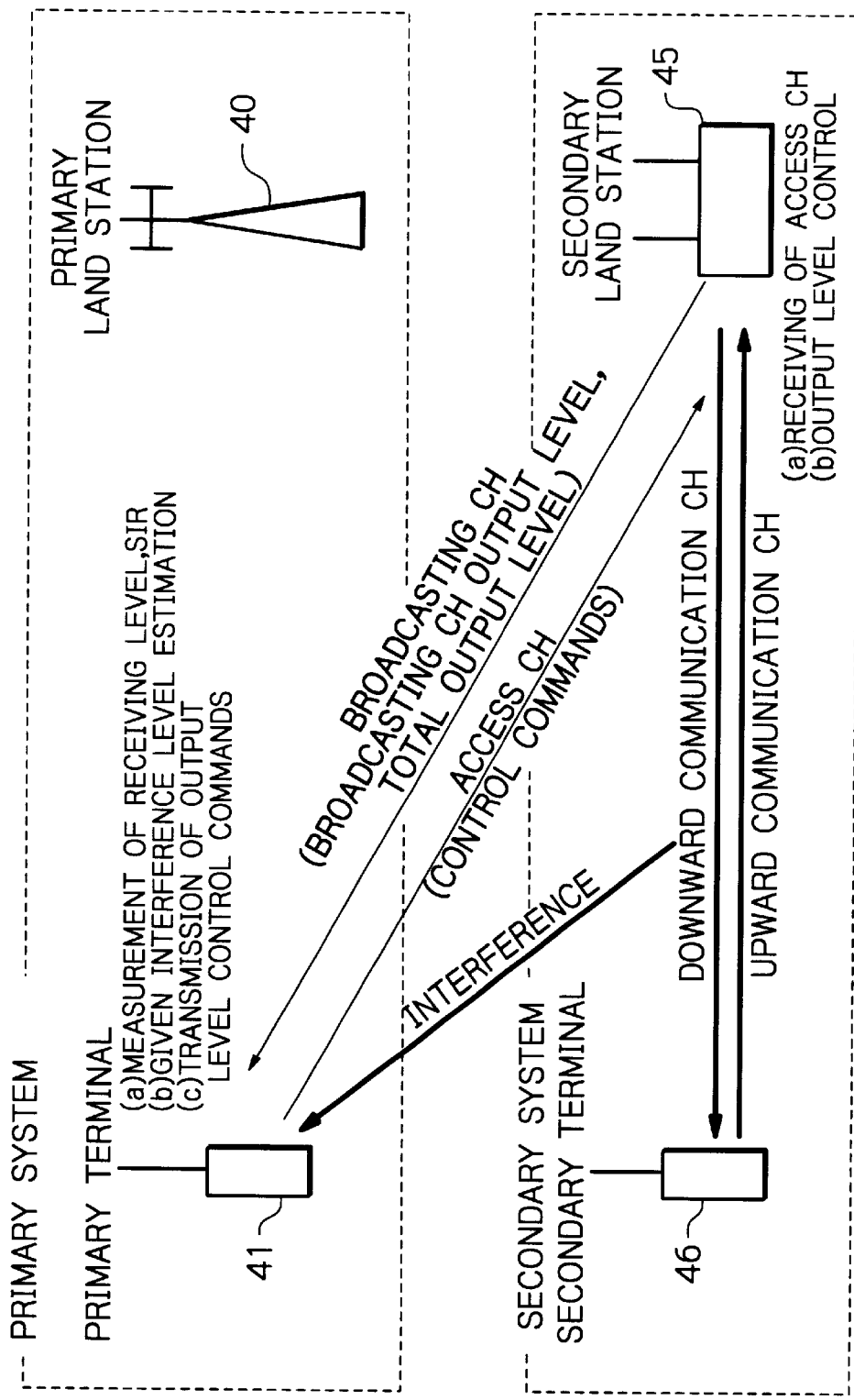
FIG. 7 illustrates a system configuration to prevent interference between a land station of a secondary system and a terminal of a primary system in another embodiment according to the present invention.
Figure 8:
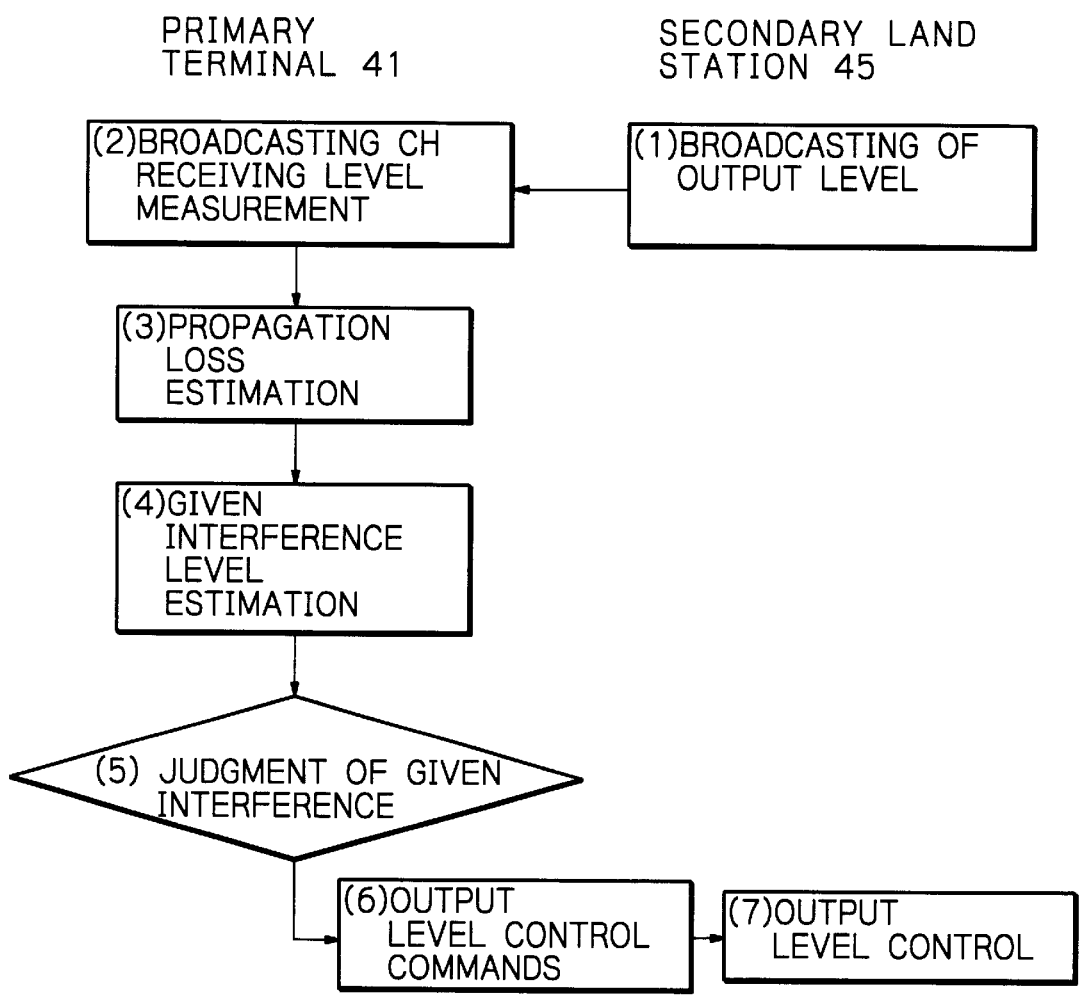
FIG. 8 illustrates a flow chart of the control process of the land station of the secondary system and the terminal of the primary system shown in FIG. 7.

FIG. 7 illustrates a system configuration to prevent interference between a secondary land station 45 and a primary terminal 41 in another embodiment according to the present invention, and FIG. 8 illustrates a flow chart of the control process of the secondary land station 45 and the primary terminal 41 shown in FIG. 7.

In this embodiment, the primary terminal 41 estimates the level of given interference onto this primary terminal 41 based upon the receiving condition and the status information of the broadcasting channel from the secondary land station 45 and sends signal level control commands determined based upon the estimated given interference to the secondary land station 45 so that this secondary land station 45 controls its output signal level.

The secondary land station 45 has a broadcasting channel transmission unit for transmitting status information to the mobile terminals via the broadcasting channel, an access channel receiving unit for obtaining information of given interference onto the primary terminal 41 via the access channel, and an output signal level control unit for controlling its output signal level based upon the obtained given interference information. The status information transmitted via the broadcasting channel contains the output level of the secondary land station 45, TST (dBm), and the output level of the broadcasting channel, TSB (dBm).

The primary terminal 41 has a broadcasting channel receiving unit for obtaining the output signal level of the broadcasting channel, TSB, and the output level of the secondary land station 45, TST, which are sent via the broadcasting channel, and for measuring the receiving signal level of the broadcasting channel, RSB (dBm), a given interference estimation unit for estimating the given interference onto the primary terminal 41 by the secondary land station 45 based upon the levels of RSB (dBm), TSB (dBm), TST (dBm) and SIR (dB) of the primary terminal received communication channel, and an access channel transmission unit for transmitting the estimated level of the given interference on to the primary terminal 41, INSgiven (dBm), to the secondary land station 45.

Hereinafter, operations of this embodiment are described in detail.

(1) First, the secondary land station 45 transmits the output signal level of the broadcasting channel, TPB (dBm), and the output level of the secondary land station, TST (dBm), by the broadcasting channel transmission unit via the broadcasting channel.

(2) Then, the primary terminal 41 receives the broadcasting channel of the secondary land station 45 by the broadcasting channel receiving unit of this terminal, measures the receiving signal level of the broadcasting channel of the secondary land station 45, RSB (dBm), and gets the output signal level of the broadcasting channel of the secondary land station 45, TSB (dBm), and the output level of the secondary land station 45, TST (dBm). Also the primary terminal 41 detects SIR (dB) of the communication channel through which this terminal receives signals.

(3) Then, the primary terminal 41 estimates a radio wave propagation loss Ldown (dB) from the secondary land station 45 to the primary terminal 41 based upon the difference between the output level of the broadcasting channel TSB (dBm) and the receiving level of the broadcasting channel RSB (dBm). Ldown is given by the following equation, $$L\text{down} = TSB - RSB \qquad \text{(dB)}.$$

(4) Then, the primary terminal 41 estimates the level of given interference onto the communication channel of the primary system by the secondary land station 45, INSgiven (dBm), based upon the output level of the secondary land station 45, TST (dBm), and the previously estimated value of the propagation loss, Ldown (dB), using the following equation, $$INS\text{given}=TST-L\text{down} \qquad (\text{dBm}).$$

(5) Then, the primary terminal 41 recognizes that the communication channel is interfered by the secondary land station 45 when the given interference level, INSgiven (dBm), exceeds a specified level or the ratio of INSgiven to the total interference level exceeds a specified level.

(6) Thereafter, when the primary terminal 41 recognizes that the communication channel is interfered by the secondary land station 45, this primary terminal 41 transmits commands for lowering the output level to the secondary land station 45 via the access channel.

(7) Finally, the secondary land station 45 lowers its output signal level in accordance with the commands transmitted via the access channel. This lowering control takes priority over the output level control for the communication between the secondary terminal 46 and the secondary land station 45.

Figure 9:
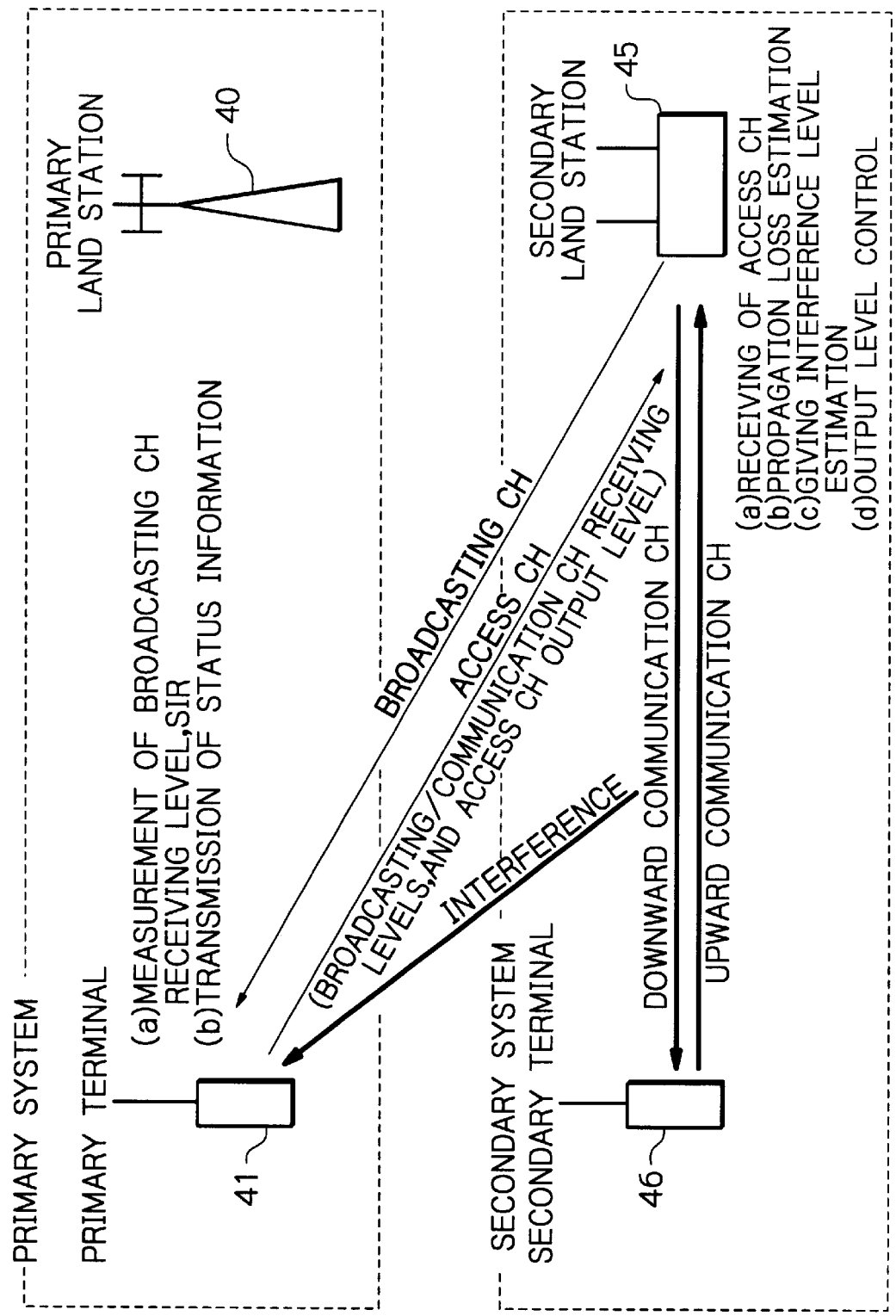
FIG. 9 illustrates a system configuration to prevent interference between a land station of a secondary system and a terminal of a primary system in a further embodiment according to the present invention.
Figure 10:
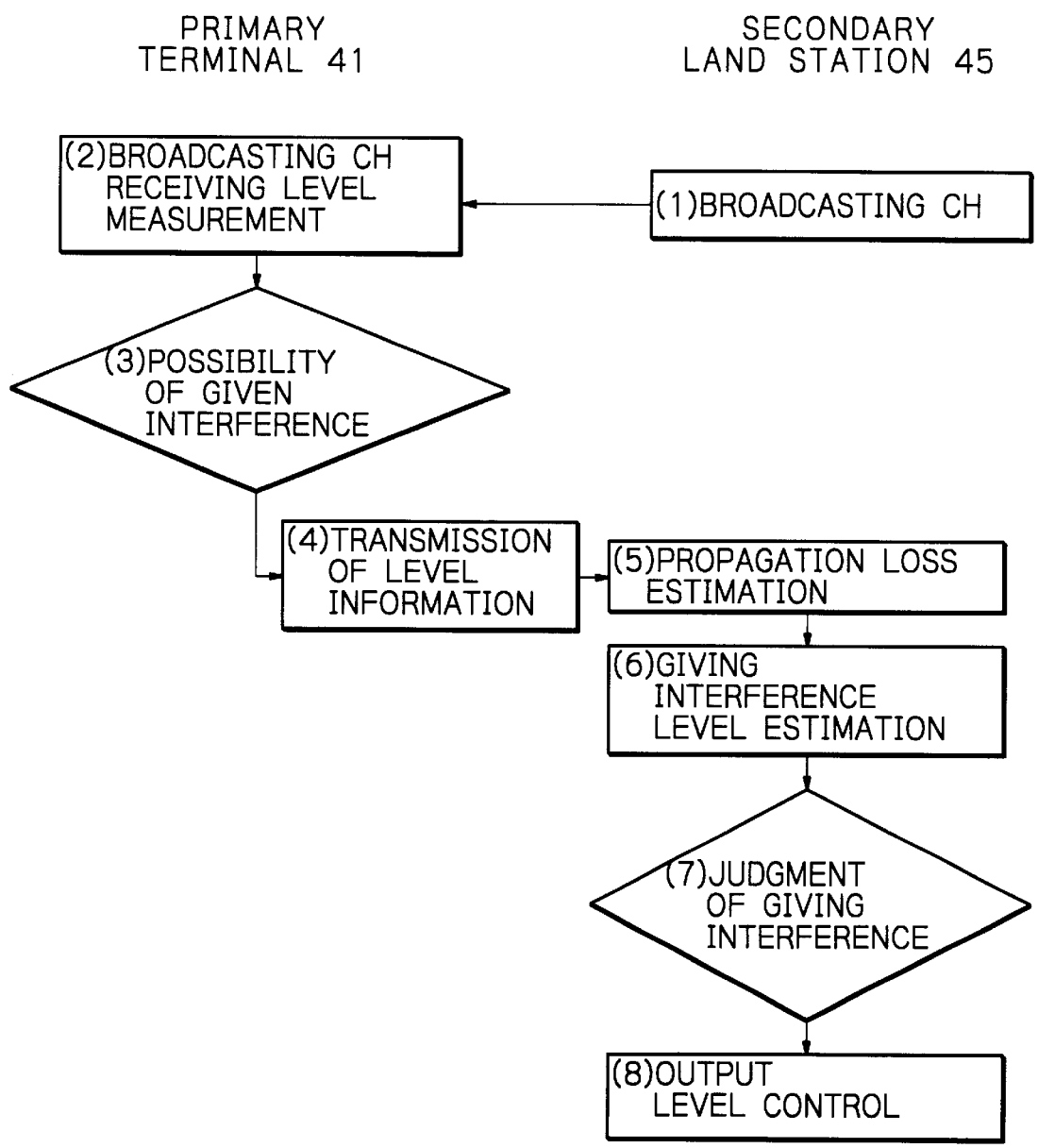
FIG. 10 illustrates a flow chart of the control process of the land station of the secondary system and the terminal of the primary system shown in FIG. 9.

FIG. 9 illustrates a system configuration to prevent interference between a secondary land station 45 and a primary terminal 41 in a further embodiment according to the present invention, and FIG. 10 illustrates a flow chart of the control process of the secondary land station 45 and the primary terminal 41 shown in FIG. 9.

In this embodiment, the secondary land station 45 controls its output signal level by estimating the level of the interference onto the primary terminal 41 based upon the received status information from the primary terminal 41.

The secondary land station 45 has a broadcasting channel transmission unit for transmitting the broadcasting channel signals to the mobile terminals via the broadcasting channel, an access channel receiving unit for obtaining the receiving condition and status information of the primary terminal 41 sent via the access channel from the primary terminal 41, a giving interference estimation unit for estimating the level of the giving interference onto the primary system based upon the obtained receiving condition and status information, and an output signal level control unit for controlling its output level based upon the estimated level of the giving interference onto the primary system.

The primary terminal 41 has a broadcasting channel receiving unit for measuring the receiving signal level of the broadcasting channel signals from the secondary land station 45, and an access channel transmission unit for transmitting the receiving level and the status information to the secondary land station 45 via the access channel.

Hereinafter, operations of this embodiment are described in detail.

(1) First, the secondary land station 45 transmits the signals by the broadcasting channel transmission unit via the broadcasting channel.

(2) Then, the primary terminal 41 receives the signals via the broadcasting channel and measures the receiving signal level of the broadcasting channel, RSB (dBm).

(3) Then, the primary terminal 41 judges possibility of given interference by the secondary land station 45 taking account the SIR level of the communication channel through which this primary terminal 41 receives signals, when the receiving level of the broadcasting channel, RSB (dBm), exceeds a specified level. For example, when the SIR level of the communication channel used by the primary terminal 41 in the primary system is good, the possibility of the given interference by the secondary system might be smaller, even if the receiving level of the broadcasting channel from the secondary land station 45, RSB (dBm), is more higher than a specified level.

(4) When a definite possibility of the given interference is detected, the primary terminal 41 transmits the information of the receiving signal level of the broadcasting channel, RSB (dBm), the receiving signal level of the communication channel in the primary system, RPT (dBm), and the output level of the access channel, TPR (dBm), to the secondary land station 45 via the access channel.

(5) The secondary land station 45 receives the transmitted information by the access channel receiving unit via the access channel to obtain the information of RSB (dBm), RPT (dBm) and TPR (dBm), and measures the access channel receiving signal level, RPR (dBm).

Then, the secondary land station 45 estimates the radio wave propagation loss Ldown (dB) from the secondary land station 45 to the primary terminal 41 based upon the difference between the output level of the broadcasting channel TSB (dBm) and the receiving level of the broadcasting channel RSB (dBm). Ldown is given by the following equation, $$L\text{down}=TSB-RSB \qquad (\text{dB}).$$

Otherwise, the secondary land station 45 estimates the radio wave propagation loss Lup (dB) from the primary terminal 41 to the secondary land station 45 based upon the difference between the output level of the access channel, TPR (dBm), and the receiving level of the access channel RPR (dBm). Lup is given by the following equation, $$L\text{up}=TPR-RPR \qquad (\text{dB}).$$

The frequency-depended radio wave propagation loss Ldown (dB) from the secondary land station 45 to the primary terminal 41 is thus estimated based upon frequency difference by using for example the following equation;

$$L\text{down}=L\text{up}+A\times\log(f\text{down}/f\text{up}) \qquad (\text{dB})$$

where A is a constant in the range of 20 through 35, usually about 26 is used for it.

(6) Thereafter, the secondary land station 45 estimates the level of the giving interference onto the primary terminal 41, INSgiving (dBm), based upon the output level of the secondary land station 45, TST (dBm), and the previously estimated value of the propagation loss, Ldown, using the following equation, $$INS\text{giving}=TT-L\text{up} \qquad (\text{dBm}).$$

(7–8) Then, the secondary land station 45 controls its output level depending upon the difference between the receiving signal level of the communication channel in the primary system, RPT (dBm), and the estimated giving interference level, INSgiving (dBm), RPT−INSgiving, by the output signal level control unit. When the difference exceeds a specified level, it is judged that the output signal of the secondary land station 45 interferes the communication channel received by the primary terminal 41, and thus output level of the secondary land station 45 is lowered. This lowering control takes priority over the output level control for the communication between the secondary terminal 46 and the secondary land station 45.

Figure 11:
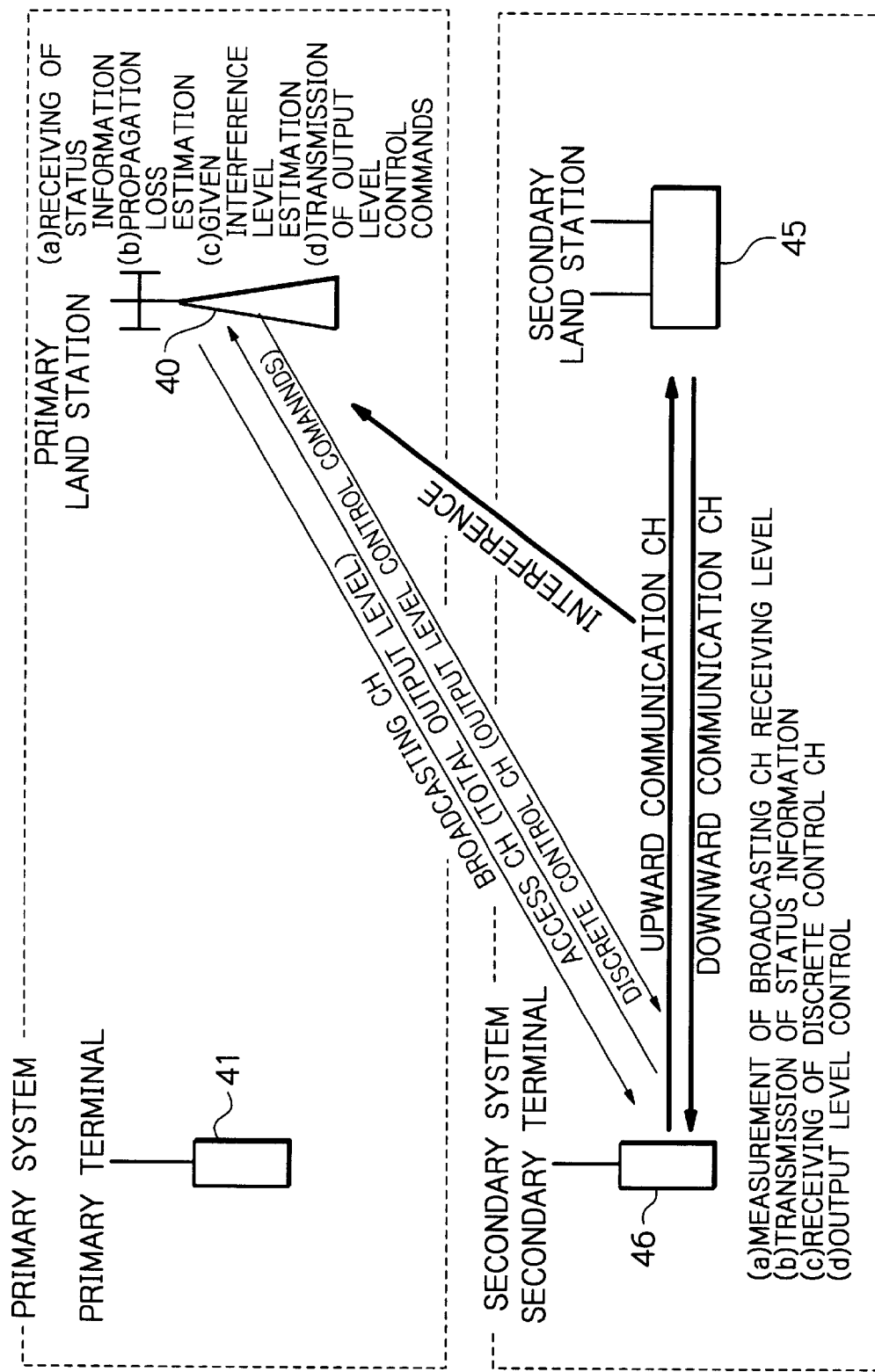
FIG. 11 illustrates a system configuration to prevent interference between a land station of a primary system and a terminal of a secondary system in a still further embodiment according to the present invention.
Figure 12:
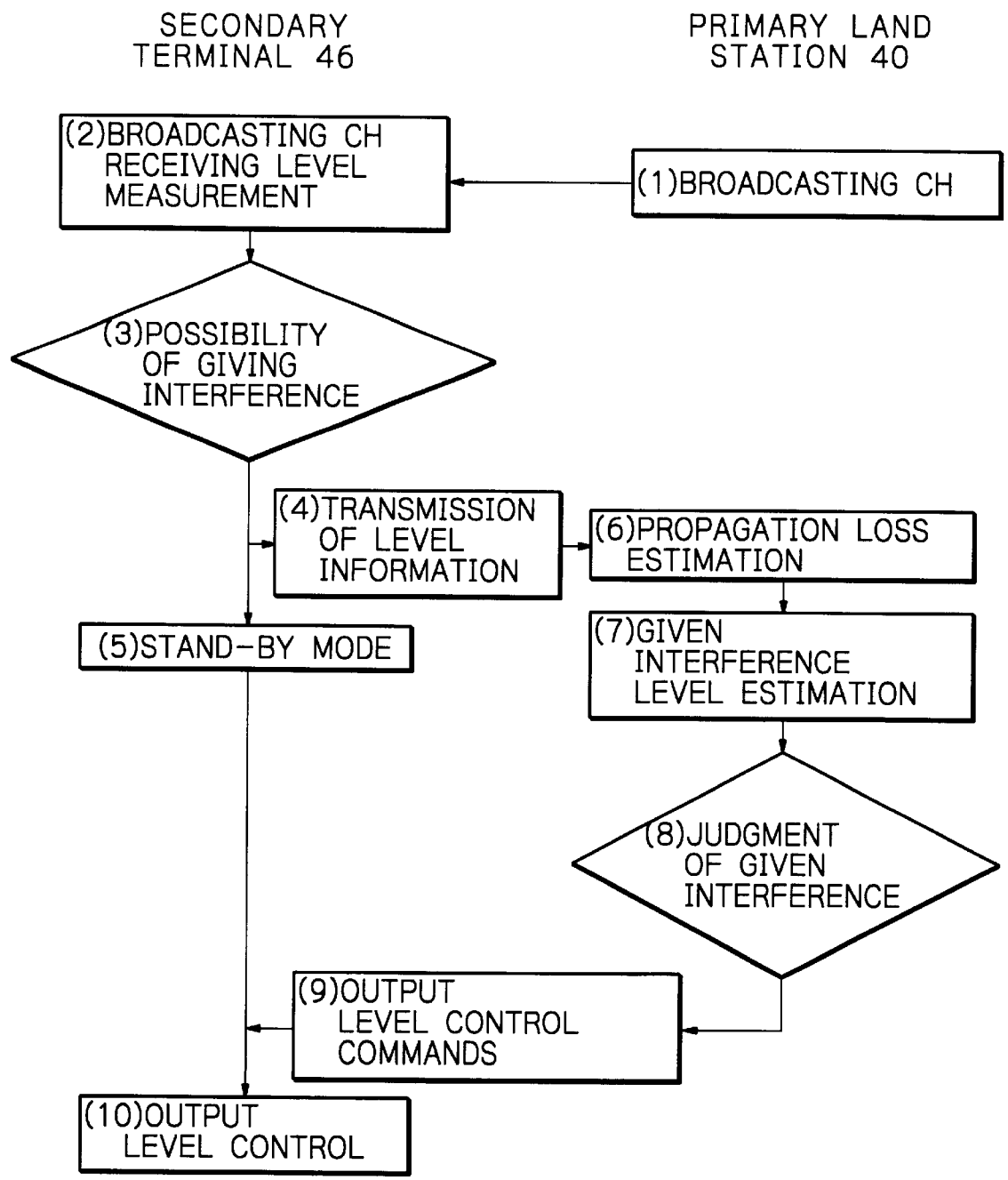
FIG. 12 illustrates a flow chart of the control process of the land station of the primary system and the terminal of the secondary system shown in FIG. 11.

FIG. 11 illustrates a system configuration to prevent interference between a primary land station 40 and a secondary terminal 46 in a further embodiment according to the present invention, and FIG. 12 illustrates a flow chart of the control process of the primary land station 40 and the secondary terminal 46 shown in FIG. 11.

In this embodiment, the secondary terminal 46 controls its output signal level based upon the level of given interference (onto the primary land station) which is estimated by the primary land station 40.

The primary land station 40 has a broadcasting channel transmission unit for transmitting signals to the mobile terminals via the broadcasting channel, an access channel receiving unit for obtaining the receiving level of the access channel and the status information sent from the secondary terminal 46 via the access channel, a given interference estimation unit for estimating the given interference from the secondary terminal 46 based upon the receiving level and the status information, and a discrete control channel transmission unit for transmitting the commands to control the output level of the secondary terminal 46 based upon the estimation of the level of the given interference.

The secondary terminal 46 has a broadcasting channel receiving unit for obtaining the receiving signal level at the primary land station 40 of the broadcasting channel, an access channel transmission unit for transmitting the receiving signal level and the status information to the primary land station 40 via the access channel, a discrete control channel receiving unit for obtaining the receiving level of the discrete control channel and the status information at the primary land station 40, and an output level control unit for controlling its output level based upon the receiving level and the status information.

Hereinafter, operations of this embodiment are described in detail.

(1) First, the primary land station 40 transmits the signals by the broadcasting channel transmission unit via the broadcasting channel.

(2) Then, the secondary terminal 46 receives the signals via the broadcasting channel and measures the receiving signal level of the broadcasting channel, RPB (dBm).

(3) Then, the secondary terminal 46 judges the possibility of the interference by the primary land station 40, when the receiving level of the broadcasting channel, RPB (dBm), exceeds a specified level.

(4) When a definite possibility of the interference is detected, the secondary terminal 46 transmits the level RPB (dBm) and the output level of the secondary terminal 46, TT (dBm), to the primary land station 40 via the access channel by the access channel transmission unit.

(5) Then, the secondary terminal 46 goes to the state of waiting for commands to control the output level from the primary land station 40. At this time, at least one of the de-spreading processors such as matched-filters or correlators for the receiver is under stand-by mode for processing of the command signal from the primary land station 40. Thus, the number of the de-spreading processors which can use for the communication of the secondary terminal 46 is reduced as many as that under the stand-by mode.

(6) On the other hand, the primary land station 40 receives the information via the access channel by the access channel receiving unit to obtain RPB and TT levels in the received information, and measures the receiving signal level of the access channel, RSR (dBm). Then, the primary land station 40 estimates radio wave propagation loss Ldown (dB) from the primary land station 40 to the secondary terminal 46 based upon the difference between the output level of the broadcasting channel, TPB (dBm), and the receiving level of the broadcasting channel, RPB (dBm). Ldown is given by the following equation, $$L\text{down} = TPB - RPB \quad (\text{dB}).$$

The frequency-depended radio wave propagation loss Lup (dB) from the secondary terminal 46 to the primary land station 40 is estimated based upon the frequency difference. For example the following equation is used to estimate the frequency dependency of the propagation loss;

$$L\text{up} = L\text{down} + A \times \log(f\text{up}/f\text{down}) \quad (\text{dB}),$$

where A is a constant in the range of 20 through 35, usually about 26 is used for it.

(7) Then, the primary land station 40 estimates the level of the given interference onto this primary land station, INS-given (dBm), based upon the output level of the secondary terminal 46, TT (dBm), and the previously estimated value of the propagation loss, Lup (dB), using the following equation, $$INS \text{ given} = TT - L\text{up}$$

(8–9) Thereafter, the primary land station 40 sends the commands to the secondary terminal 46 for lowering its output level by the discrete control channel transmission unit, when the given interference level, INSgiven, exceeds a specified level.

(10) Finally, the secondary terminal 46 controls the output level by the output level control unit when the secondary terminal 46 receives the commands for output level control by the discrete control channel receiving unit. This lowering control takes priority over the output level control for the communication between the secondary terminal 46 and the secondary land station 45.

The criteria of the interference levels to proceed the output level controls can be changed depending upon the traffic condition of the primary land station. For example, under the condition of smaller number of traffics, the criteria can be set at higher levels, and hence the output signal level and communication quality of the secondary system can be afforded. However, the battery operation life at the terminal becomes shorter when the output level of the primary terminal is increased.

The mobile communication system according to the present invention with number of systems of land stations and mobile portable terminals has advantages of high quality communication of a primary system suppressing the interference from the secondary system, and advantages of maximized utilization of the radio channel resource for the communication by the secondary system for good services. The mobile communication system can be typically applied to the system in which the primary system is by a public mobile communication system and the secondary system by a private mobile communication system or a narrow area communication system like code-less telephone.

Many widely different embodiments of the present invention may be constructed without departing from the spirit and scope of the present invention. It should be understood that the present invention is not limited to the specific embodiments described in the specification, except as defined in the appended claims.

What is claimed is:

1. A mobile communication system including a first and second systems, each of said first and second systems having a land station and at least one mobile terminal capable of communicating with the land station, the land station of said first system having a broadcasting channel transmission means for transmitting status information via a broadcasting channel, and the mobile terminal of said second system having a broadcasting channel receiving means for receiving information in said broadcasting channel to obtain a broadcasting channel receiving condition and said status information, a giving interference estimation means for estimating giving interference level onto communication of said first system by said second system based upon said obtained broadcasting channel receiving condition and said obtained status information, and an output signal level control means for controlling output signal level of said mobile terminal of said second system based upon the estimated giving interference level.

2. The mobile communication system as claimed in claim 1, wherein a plurality of systems are prioritized, and wherein said first system is a primary system and said second system is a secondary system.

3. The mobile communication system as claimed in claim 2, wherein said output signal level control means includes means for controlling the output level depending upon traffic condition of said land station of said primary system.

4. The mobile communication system as claimed in claim 2, wherein said land station of said primary system is connected with a public mobile switch system, and wherein said land station of said secondary system is connected with a private branch exchange system.

5. The mobile communication system as claimed in claim 1, wherein said receiving condition of the broadcasting channel includes receiving signal level from the broadcasting channel, and wherein said status information includes output level to the broadcasting channel.

6. The mobile communication system as claimed in claim 5, wherein said status information includes communication channel output level from a transmitting system to the broadcasting channel.

7. The mobile communication system as claimed in claim 1, wherein said giving interference estimation means includes means for estimating downward radio wave channel propagation loss Ldown from the difference between the output signal level and the received signal level of the broadcasting channel or the access channel.

8. The mobile communication system as claimed in claim 7, wherein said giving interference estimation means further includes means for estimating upward radio wave channel propagation loss Lup from equation, $$Lup = Ldown + A\log(fup/fdown) \quad (dB),$$

where A is a constant in the range of 20 to 35, and fup and fdown are frequencies of upward and downward communications.

9. The mobile communication system as claimed in claim 7, wherein said giving interference estimation means further includes means for determining giving interference level as a value obtained by subtracting the estimated propagation loss from the output level to the broadcasting channel or the access channel.

10. A mobile communication system including a first and second systems, each of said first and second systems having a land station and at least one mobile terminal capable of communicating with the land station, the land station of said first system having a broadcasting channel transmission means for transmitting status information via a broadcasting channel, an access channel receiving means for obtaining given interference level information sent via an access channel, and an output signal level control means for controlling output signal level of said land station of said first system based upon said obtained given interference level information, and the mobile terminal of said second system having a broadcasting channel receiving means for obtaining broadcasting channel receiving condition and status information, a given interference estimation means for estimating given interference level onto communication of said second system by said first system based upon said obtained receiving condition and said obtained status information, and an access channel transmission means for transmitting said estimated given interference level information to said land station of said first system.

11. The mobile communication system as claimed in claim 10, wherein a plurality of systems are prioritized, and wherein said first system is a secondary system and said second system is a primary system.

12. The mobile communication system as claimed in claim 11, wherein said output signal level control means includes means for controlling the output level depending upon traffic condition of said land station of said primary system.

13. The mobile communication system as claimed in claim 11, wherein said land station of said primary system is connected with a public mobile switch system, and wherein said land station of said secondary system is connected with a private branch exchange system.

14. The mobile communication system as claimed in claim 10, wherein said receiving condition of the broadcasting channel includes receiving signal level from the broadcasting channel, and wherein said status information includes output level to the broadcasting channel.

15. The mobile communication system as claimed in claim 12, wherein said status information includes communication channel output level from a transmitting system to the broadcasting channel.

16. The mobile communication system as claimed in claim 1, wherein said giving interference estimation means includes means for estimating downward radio wave channel propagation loss Ldown from the difference between the output signal level and the received signal level of the broadcasting channel or the access channel.

17. The mobile communication system as claimed in claim 16, wherein said given interference estimation means further includes means for estimating upward radio wave channel propagation loss Lup from equation, $$Lup = Ldown + A \times \log(fup/fdown) \quad (dB),$$

where A is a constant in the range of 20 to 35, and fup and fdown are frequencies of upward and downward communications.

18. The mobile communication system as claimed in claim 16, wherein said given interference estimation means further includes means for determining given interference level as a value obtained by subtracting the estimated propagation loss from the output level to the broadcasting channel or the access channel.

19. A mobile communication system including a first and second systems, each of said first and second systems having a land station and at least one mobile terminal capable of communicating with the land station, the land station of said first system having a broadcasting channel transmission means for transmitting status information via a broadcasting channel, an access channel receiving means for obtaining receiving condition and status information from said mobile terminal of said second system via an access channel, a giving interference estimation means for estimating giving interference level onto communication of said second system from said first system based upon said obtained receiving condition and said obtained status information, and an output signal level control means for controlling output signal level of said land station of said first system based upon said estimated giving interference level, and the mobile terminal of said second system having a broadcasting channel receiving means for obtaining the broadcasting channel receiving condition and the status information, and an access channel transmission means for transmitting said obtained receiving condition and said obtained status information via the access channel to said land station of said first system.

20. The mobile communication system as claimed in claim 19, wherein a plurality of systems are prioritized, and wherein said first system is a secondary system and said second system is a primary system.

21. The mobile communication system as claimed in claim 20, wherein said output signal level control means includes means for controlling the output level depending upon traffic condition of said land station of said primary system.

22. The mobile communication system as claimed in claim 20, wherein said land station of said primary system is connected with a public mobile switch system, and wherein said land station of said secondary system is connected with a private branch exchange system.

23. The mobile communication system as claimed in claim 19, wherein said receiving condition of the broadcasting channel includes receiving signal level from the broadcasting channel, and wherein said status information includes output level to the broadcasting channel.

24. The mobile communication system as claimed in claim 23, wherein said status information includes communication channel output level from a transmitting system to the broadcasting channel.

25. The mobile communication system as claimed in claim 19, wherein said giving interference estimation means includes means for estimating downward radio wave channel propagation loss Ldown from the difference between the output signal level and the received signal level of the broadcasting channel or the access channel.

26. The mobile communication system as claimed in claim 25, wherein said giving interference estimation means further includes means for estimating upward radio wave channel propagation loss Lup from equation, $$Lup = Ldown + A \times \log(fup/fdown) \quad (dB),$$

where A is a constant in the range of 20 to 35, and fup and fdown are frequencies of upward and downward communications.

27. The mobile communication system as claimed in claim 25, wherein said giving interference estimation means further includes means for determining giving interference level as a value obtained by subtracting the estimated propagation loss from the output level to the broadcasting channel or the access channel.

28. A mobile communication system including a first and second systems, each of said first and second systems having a land station and at least one mobile terminal capable of communicating with the land station, the land station of said first system having a broadcasting channel transmission means for transmitting status information via a broadcasting channel, an access channel receiving means for obtaining receiving condition and status information from said mobile terminal of said second system via an access channel, a given interference estimation means for estimating given interference level onto communication of said first system from said second system based upon said obtained receiving condition and said obtained status information, and a discrete control channel transmission means for transmitting commands to control the output signal level of the mobile terminal of said second system based upon said estimated given interference level via a discrete control channel, and the mobile terminal of said second system having a broadcasting channel receiving means for obtaining the broadcasting channel receiving condition and the status information, an access channel transmission means for transmitting said obtained receiving condition and said obtained status information to said land station of said first system via an access channel, a discrete control channel receiving means for obtaining the commands to control the output signal level, and an output signal level control means for controlling output signal level of said mobile terminal of said second system based upon the obtained commands.

29. The mobile communication system as claimed in claim 28, wherein a plurality of systems are prioritized, and wherein said first system is a primary system and said second system is a secondary system.

30. The mobile communication system as claimed in claim 29, wherein said output signal level control means includes means for controlling the output level depending upon traffic condition of said land station of said primary system.

31. The mobile communication system as claimed in claim 29, wherein said land station of said primary system is connected with a public mobile switch system, and wherein said land station of said secondary system is connected with a private branch exchange system.

32. The mobile communication system as claimed in claim 28, wherein said receiving condition of the broadcasting channel includes receiving signal level from the broadcasting channel, and wherein said status information includes output level to the broadcasting channel.

33. The mobile communication system as claimed in claim 32, wherein said status information includes communication channel output level from a transmitting system to the broadcasting channel.

34. The mobile communication system as claimed in claim 28, wherein said given interference estimation means includes means for estimating downward radio wave channel propagation loss Ldown from the difference between the output signal level and the received signal level of the broadcasting channel or the access channel.

35. The mobile communication system as claimed in claim 34, wherein said given interference estimation means further includes means for estimating upward radio wave channel propagation loss Lup from equation, $$Lup = Ldown + A \times \log(fup/fdown) \quad (dB),$$

where A is a constant in the range of 20 to 35, and fup and fdown are frequencies of upward and downward communications.

36. The mobile communication system as claimed in claim 34, wherein said given interference estimation means further includes means for determining given interference level as a value obtained by subtracting the estimated propagation loss from the output level to the broadcasting channel or the access channel.

* * * * *